United States Patent
Keam

(10) Patent No.: US 8,125,458 B2
(45) Date of Patent: Feb. 28, 2012

(54) DETECTING FINGER ORIENTATION ON A TOUCH-SENSITIVE DEVICE

(75) Inventor: Nigel Keam, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 838 days.

(21) Appl. No.: 11/864,650

(22) Filed: Sep. 28, 2007

(65) Prior Publication Data

US 2009/0085881 A1    Apr. 2, 2009

(51) Int. Cl.
G06F 3/041 (2006.01)
G06K 9/46 (2006.01)
G06K 9/38 (2006.01)
G06K 9/36 (2006.01)

(52) U.S. Cl. ......... 345/173; 382/190; 382/272; 382/289

(58) Field of Classification Search .......... 345/173–178; 178/18.01–18.11; 341/5, 22, 33–34, 6; 382/115–116, 119–126, 181, 190, 199, 203, 382/195, 197, 205–206, 270–274, 286–289, 382/291, 295–296; 715/730–737, 750–759, 715/863

See application file for complete search history.

(56) References Cited

U.S. PATENT DOCUMENTS

| | | | |
|---|---|---|---|
| 4,302,011 A | 11/1981 | Pepper, Jr. | |
| 5,168,531 A | 12/1992 | Sigel | |
| 6,002,808 A | 12/1999 | Freeman | |
| 6,292,173 B1 * | 9/2001 | Rambaldi et al. | 345/157 |
| 6,876,757 B2 | 4/2005 | Yau et al. | |
| 7,072,496 B2 | 7/2006 | Lo et al. | |
| 7,136,514 B1 | 11/2006 | Wong | |
| 7,469,381 B2 * | 12/2008 | Ording | 715/702 |
| 2002/0030668 A1 | 3/2002 | Hoshino et al. | |
| 2003/0044052 A1 | 3/2003 | Martin | |

(Continued)

FOREIGN PATENT DOCUMENTS

WO    WO0169520 A2    9/2001

(Continued)

OTHER PUBLICATIONS

Lee, Jangho and Jee-In Kim. "u-Table: A Tabletop Interface for Multiple Users." In: ICCSA2006—Computational Science and Its Applications. Lecture Notes in Computer Science, 2006, pp. 983-992.

(Continued)

*Primary Examiner* — Bipin Shalwala
*Assistant Examiner* — Keith Crawley
(74) *Attorney, Agent, or Firm* — Alleman Hall McCoy Russell & Tuttle LLP

(57) ABSTRACT

The determination of an orientation of a finger touching a touch-sensitive device is disclosed. In one embodiment, a computing device comprises a display screen configured to display an image to a user, and an intensity-sensitive touch-sensing input mechanism configured to detect one or more objects touching the display screen. The device also comprises a controller configured to determine an orientation of a finger touching the screen from a direction between a center of a first set of touch data and a center of a second set of touch data, and to adjust an image on the display screen in response to a determined orientation of the finger.

19 Claims, 6 Drawing Sheets

U.S. PATENT DOCUMENTS

| | | | |
|---|---|---|---|
| 2005/0117785 A1 | 6/2005 | Boshra | |
| 2005/0226505 A1* | 10/2005 | Wilson | 382/180 |
| 2005/0271279 A1 | 12/2005 | Fujimura et al. | |
| 2006/0244735 A1 | 11/2006 | Wilson | |
| 2007/0008300 A1 | 1/2007 | Yang et al. | |
| 2007/0139395 A1* | 6/2007 | Westerman et al. | 345/173 |
| 2007/0188518 A1 | 8/2007 | Vale et al. | |
| 2007/0201863 A1 | 8/2007 | Wilson et al. | |
| 2007/0229477 A1* | 10/2007 | Ludwig | 345/173 |
| 2008/0158185 A1* | 7/2008 | Westerman | 345/173 |

FOREIGN PATENT DOCUMENTS

| | | | |
|---|---|---|---|
| WO | 2006025872 A2 | 3/2006 | |

OTHER PUBLICATIONS

ISA Korea, International Search Report of PCT/US2008/076625, Mar. 27, 2009, 4 pages.

Letessier, et al., "Visual Tracking of Bare Fingers for Interactive Surfaces" UIST'04, Oct. 24-27, vol. 6, Issue 2 ACM, 2004, pp. 119-122.

Malassiotis, et al., "Personal Authentication Using 3D Finger Geometry", IEEE Transactions on Information Forensics and Security, vol. 1, No. 1, Mar. 2006, pp. 1-23.

Tico, et al., "Fingerprint Matching Using an Orientation-Based Minutia Descriptor", IEEE Transactions on Pattern Analysis and Intelligence, vol. 25, No. 8, Aug. 2003, pp. 1009-1014.

* cited by examiner

DETECTING FINGER ORIENTATION ON A TOUCH-SENSITIVE DEVICE

BACKGROUND

Touch-sensitive devices may detect touch via several different mechanisms, including but not limited to optical, resistive, and capacitive mechanisms. In many devices utilizing a touch-sensitive input, it may be useful to determine the orientation of a finger, for example, to determine an orientation for displaying text or images on the device, to distinguish between users of a multi-user device, and/or to allow a user to control rotation of an image on a touch-sensitive display by rotating a finger over the image.

Various methods may be used for determining an orientation of a finger on a touch-sensitive device. For example, one approach involves attempting to match an image of a body of a finger pointing away from a fingertip utilizing a template algorithm to look for a match to a theoretical finger. However, such an approach may be difficult to implement, and may lead to incorrect results as well as sudden changes in determined orientation where errors in template matching occur.

SUMMARY

Accordingly, the determination of an orientation of a finger touching a touch-sensitive device is described below in the Detailed Description. In one disclosed embodiment, a computing device comprises a display screen configured to display an image to a user, and an intensity-sensitive touch-sensing input mechanism configured to detect one or more objects touching the display screen. The device also comprises a controller configured to determine an orientation of a finger touching the screen from a direction between a center of a first set of touch data and a center of a second set of touch data, and to adjust an image on the display screen in response to a determined orientation of the finger.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
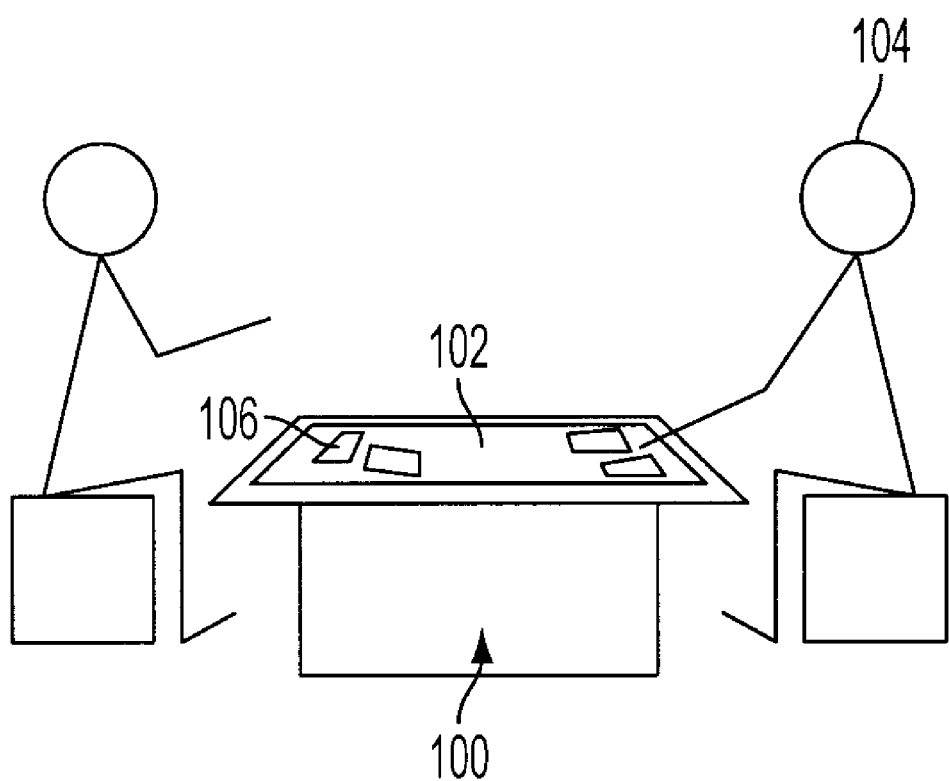
FIG. 1 shows an embodiment of a touch-sensitive interactive display device.

Prior to describing the detection of finger orientation in a touch-sensitive device, an example of a suitable use environment is briefly described. FIG. 1 shows an embodiment of a multi-user touch-sensitive display device 100. Touch-sensitive display device 100 has a table-like configuration and comprises a horizontally disposed display surface 102 with a touch-sensitive input, which is described in more detail below with reference to FIG. 2. Touch-sensitive display device 100 may be configured to detect the touch of one or more people 104 interacting with the device. Display device 100 may be used to display any suitable type of content 106 or data, including but not limited to photographic data, video data, graphical data, documents, spreadsheets, presentations, etc.

While the embodiment of FIG. 1 comprises a multi-user computing device with a horizontally-disposed touch-sensitive display surface, it will be appreciated that the embodiments discussed below and the concepts generally disclosed herein may be implemented on any suitable touch-enabled display device that can determine intensity levels for a two-dimensional array of touch data. Examples of such devices include, but are not limited to, computing devices such as laptop and desktop computers, hand-held devices, cellular phones, portable media players, personal digital assistants, cameras, video cameras, and other programmable consumer and commercial electronics and appliances having an optical, capacitive, resistive, or other suitable touch-sensitive input. As used herein, the term "computing device" may include any device that electronically executes one or more programs. The embodiments described herein may be implemented on such devices, for example, via computer-executable instructions or code, such as programs, stored on a computer-readable storage medium and executed by the computing device. Generally, programs include routines, objects, components, data structures, and the like that perform particular tasks or implement particular abstract data types. The term "program" as used herein may connote a single program or multiple programs acting in concert, and may be used to denote applications, services, or any other type or class of program.

Figure 2:
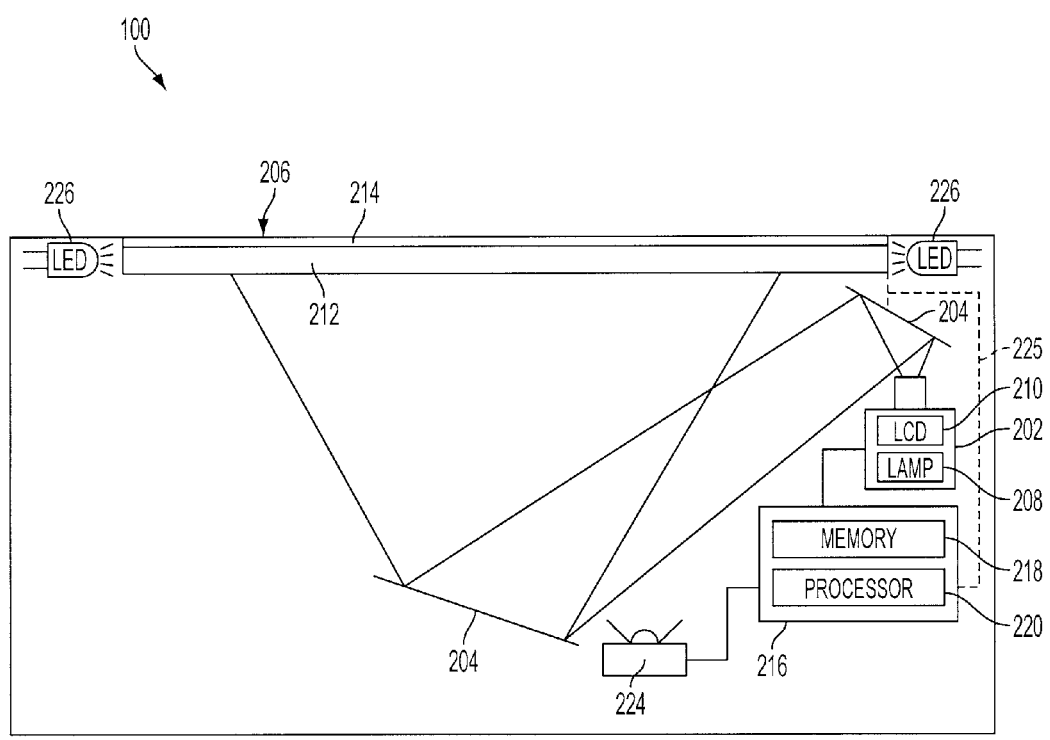
FIG. 2 shows a schematic depiction of the embodiment of FIG. 1.

FIG. 2 shows a schematic depiction of the touch-sensitive display device 100. The touch-sensitive display device 100 comprises a projection display system having an image source 202, optionally one or more mirrors 204 for increasing an optical path length and image size of the projection display, and a display screen 206 onto which images are projected.

The image source 202 includes an optical or light source 208 such as the depicted lamp, an LED array, or other suitable light source. The image source 202 also includes an image-producing element 210 such as the depicted LCD (liquid crystal display), an LCOS (liquid crystal on silicon) display, a DLP (digital light processing) display, or any other suitable image-producing element. The display screen 206 includes a clear, transparent portion 212, such as sheet of glass, and a diffuser screen layer 214 disposed on top of the clear, transparent portion 212. In some embodiments, an additional transparent layer (not shown) may be disposed over the diffuser screen layer 214 to provide a smooth look and feel to the display surface. In other embodiments, the diffuser screen layer 214 may be omitted.

Continuing with FIG. 2, the device 100 further includes an electronic controller 216 comprising memory 218 and a microprocessor 220. To sense touch on the display screen 206, the device 100 includes an image capture device 224 configured to capture an image of the entire backside of the display screen 206, and to provide the image to the controller 216 for the detection of fingers or objects appearing in the image. The diffuser screen layer 214 helps to avoid the imaging of objects that are not in contact with or positioned within a few millimeters of the display screen 206, and therefore helps to ensure that only objects that are touching the display screen 206 are detected by the image capture device 224. While the device 100 is shown having one image capture device 224, it will be appreciated that more than one image capture device 224 may be used to capture an image of the display screen 206.

The image capture device 224 may include any suitable image sensing mechanism. Examples of suitable image sensing mechanisms include but are not limited to CCD and CMOS image sensors. Further, the image sensing mechanisms may capture images of the display screen 206 at a sufficient frequency to detect motion of an object across the display screen 206. The display screen 206 may alternatively or further include an optional capacitive, resistive or other suitable touch-sensing mechanism, as illustrated by the dashed-line connection 225 of the screen 206 with the controller 216.

The image capture device 224 may be configured to detect reflected or emitted energy of any suitable wavelength, including but not limited to infrared and visible wavelengths. To assist in detecting touch on the display screen 206, the image capture device 224 may further include an illuminant such as one or more light emitting diodes (LEDs) 226 configured to produce infrared or visible light. Light from the LEDs 226 may be reflected by fingers touching the display screen 206 and then detected by the image capture device 224. The use of infrared LEDs as opposed to visible LEDs may help to avoid washing out the appearance of projected images on the display screen 206.

The LEDs 226 may be positioned at any suitable location within interactive display device 200. In the depicted embodiment, a plurality of LEDs 226 are placed along a side of the display screen 206. In this location, light from the LEDs can travel through the display screen 206 via internal reflection, while some can escape from the display screen 206 for reflection by an object on the display screen 206. In alternative embodiments, one or more LEDs may be placed beneath display screen 206 so as to pass emitted light through the display screen 206.

Because multiple users may use the display device 200 at one time, the suitable orientation of an image presented to a user on the display device 200 may depend upon which user is observing or interacting with the image. Therefore, the display device 200 may be configured to determine an orientation of one or more finger touching the display, and to display or adjust an image displayed on the device based upon the orientation of the finger determined.

Figure 3:
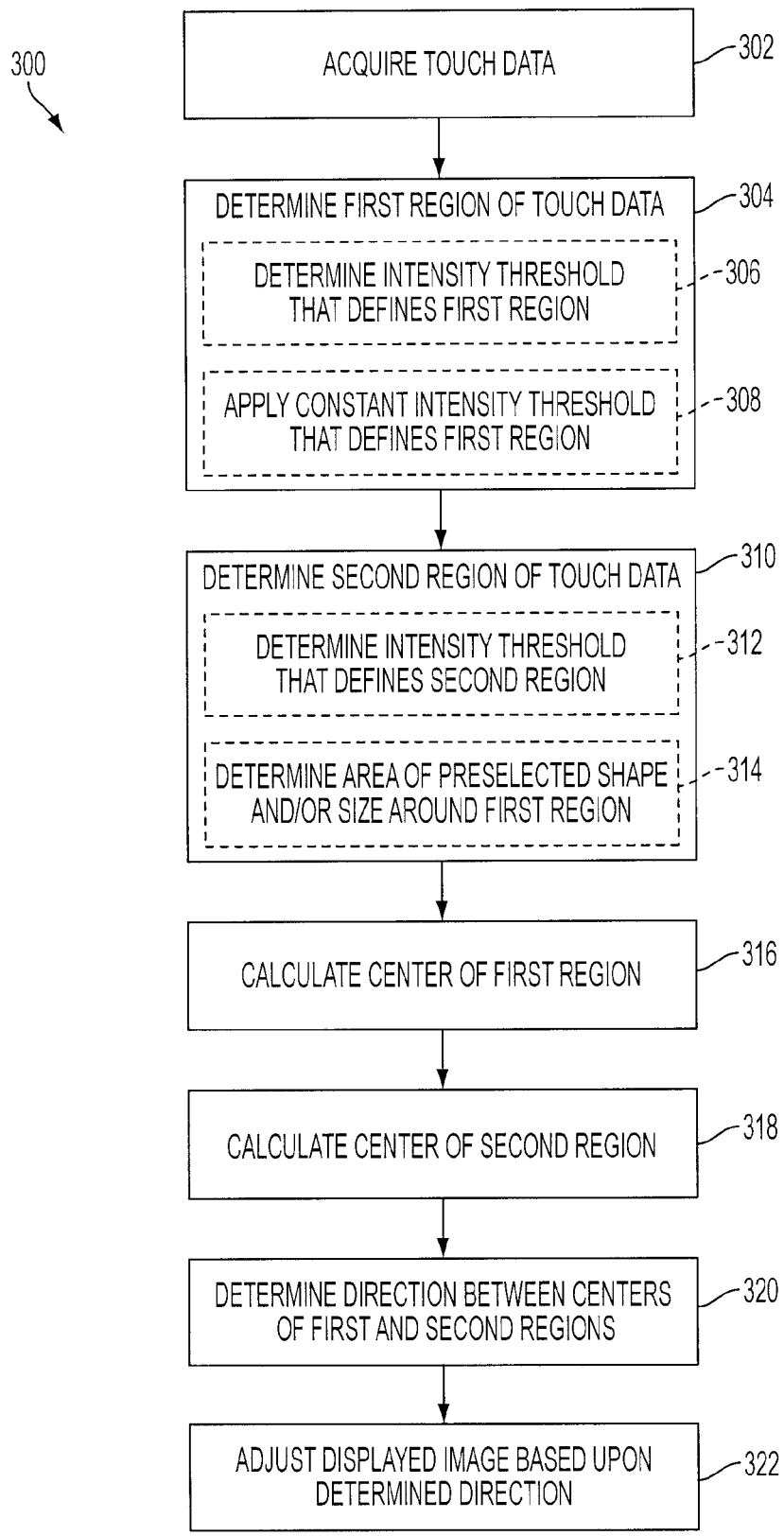
FIG. 3 shows a process flow depicting an embodiment of a method for determining an orientation of a finger on a touch-sensitive device.

FIG. 3 shows a process flow depicting a method 300 of identifying an orientation of a finger on a touch-sensitive device. Method 300 may be performed on any suitable touch-sensitive device capable of generating a two-dimensional array of touch intensity data, including but not limited to optical, capacitive and resistive touch-sensitive devices. Method 300 first comprises, at 302, acquiring touch data. For example, in an optical touch-sensitive system, acquiring touch data may comprise utilizing an image capture device or other photodetector to acquire intensity data at each pixel on a display screen. Acquiring optical touch data may also comprise correcting intensity data for ambient (external) light at each pixel. Likewise, in capacitive or resistive touch-sensitive devices, acquiring touch data may comprise detecting an electrical response in proportion to a measure of touch intensity.

Figure 4:
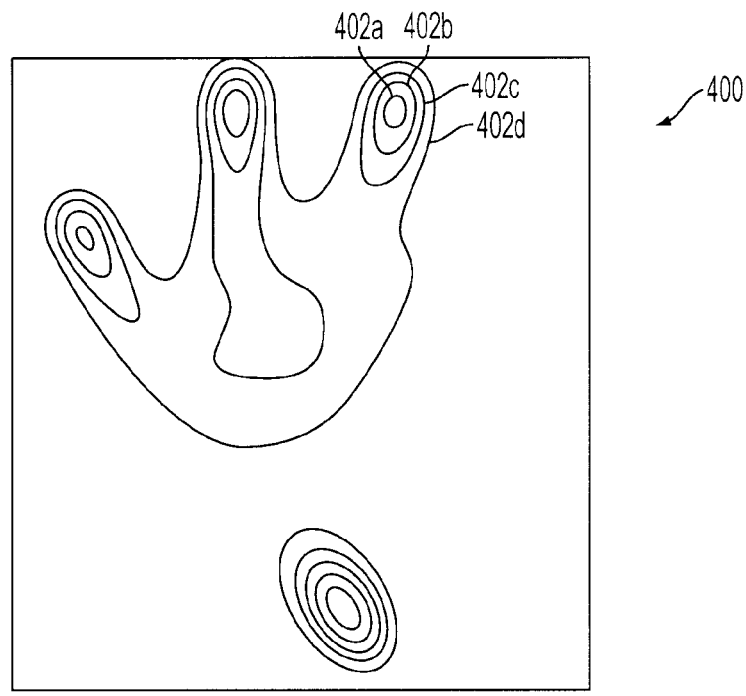
FIG. 4 shows an embodiment of an array of intensity data illustrating regions of intensity levels divided by threshold intensity levels.

Referring briefly forward to FIG. 4, this figure shows an example of an array 400 of touch intensity data illustrating regions of intensity levels shown by "contours" 402a-d each defined by lines of equal intensity value, wherein the contour lines define regions of decreasing intensity leading away from the center of a detected touch. In FIG. 4, intensity data from the touch of three fingers and a thumb can be seen. The region of the finger in contact with the screen is pressed flat against the screen, and therefore has a generally consistent brightness. Moving outwardly from this region, the ends and sides of the fingertip fade in intensity rapidly, while the rest of the finger fades more gradually in intensity, as shown by the greater spacings between contour rings in these directions. It is apparent in FIG. 4 that, as the intensity level decreases outwardly from the area of touch, the center of each contour area moves further away from the fingertip than the center of the prior ring.

Figure 5:
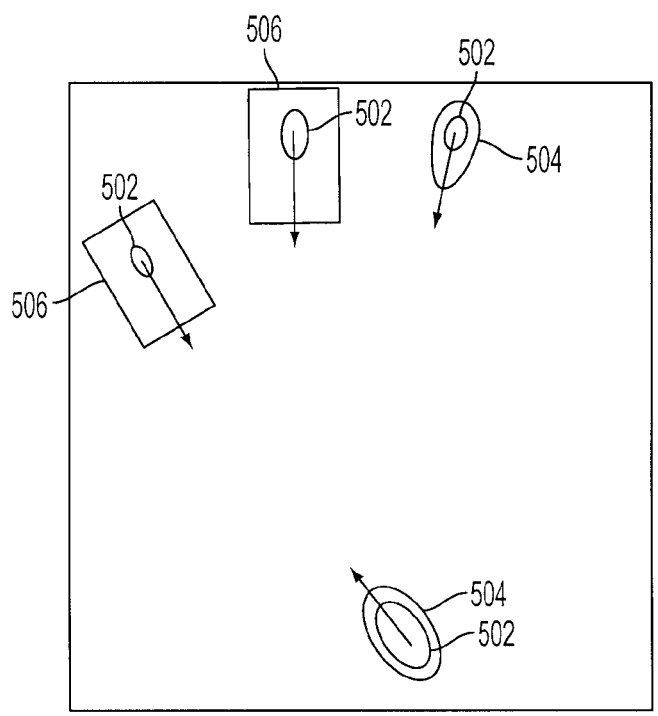
FIG. 5 shows an orientation for each finger determined via the embodiment of FIG. 3.

Referring again to FIG. 3, method 300 next comprises determining a first region of touch data, wherein substantially all of the touch data within the first region has an intensity above a threshold touch intensity. The term "determining" as used herein generally denotes defining a boundary of a region, and "substantially all" is used herein to denote that individual or small regions of pixels within an outer boundary the first region may for various reasons have values below the intensity and still may be considered part of the first region in some embodiments. As an example, a first region of touch data for an index finger is shown at 502 in FIG. 5.

The first region of touch data may be defined in any suitable manner. For example, as indicated in FIG. 3 at 306, the first region of intensity data may be defined by first determining a threshold intensity value that defines the first region. In some embodiments, the threshold intensity value is defined on a frame-by-frame basis, or on a period basis every n number of frames. Determining the threshold intensity value on a periodic or frame-by-frame basis may facilitate adapting to changing ambient levels, user touch intensities, and/or other such factors. Alternatively, as indicated at 308, a fixed intensity threshold value may be used to determine the first region of touch data in other embodiments.

Where the intensity threshold defining the first region of touch data is calculated periodically or frame-by-frame, any suitable method may be used to determine the threshold. For example, in one embodiment, a threshold intensity may be set as a weighted average intensity of an image or a portion of an image (for example, a portion around a detected touch), wherein the weight associated with each pixel is a rate of change of intensity (gradient) in that portion of the image. A rate of change of intensity may be determined, for example, by using a Sobel filter to combine the horizontal and vertical rate gradients at a pixel, as follows:

$$\text{vertical} = \begin{vmatrix} 1 & 2 & 1 \\ 0 & 0 & 0 \\ -1 & -2 & -1 \end{vmatrix}$$

$$\text{horizontal} = \begin{vmatrix} 1 & 0 & -1 \\ 2 & 0 & -2 \\ 1 & 0 & -1 \end{vmatrix}$$

$$\text{magnitude} = \sqrt{\text{horizontal}^2 + \text{vertical}^2}$$

Then, the threshold may be determined from the intensity data v(x,y) and sobel values s(x,y), as follows:

$$OptimalThreshold = \frac{\Sigma v_{xy} s_{xy}}{\Sigma s_{xy}}$$

It will be appreciated that this method for determining an intensity threshold is described for the purpose of example, and is not intended to be limiting in any manner.

Continuing with FIG. 3, method 300 next comprises, at 310, determining a second region of touch data. The second region of touch data corresponds to a region generally around the first region of touch data in which the touch intensities are lower than in the first region of touch data. The second region of touch data generally will surround the first region of touch data, although under some circumstances the first and second regions of touch data may share a common border for a portion of their respective circumferences.

The second region of touch data, like the first region of touch data, may be defined in any suitable manner. For example, as indicated at 312, the second region of touch data may be defined by a threshold value that is below the first region threshold. This is schematically shown at 504 in FIG. 5. Alternatively, as indicated at 314, the second region of touch data may have a preselected value, may correspond to an intensity threshold that is a fixed offset from the first intensity threshold that defines the first region, may correspond to a fixed proportion of pixels relative to the first region, and/or may correspond to an area of a predetermined shape and/or size around the first region. For example, the second region may correspond to a rectangular, oval, teardrop-shaped, etc. region of fixed size drawn around a center of the first region. An example of a rectangular second region is shown at 506 in FIG. 5. Generally, the second region is defined such that the outer boundary of the second region around one finger avoids encompassing intensity data from other nearby fingers. Defining the second region without regard to a second threshold value may offer reduced noise compared to the use of a second threshold value.

Turning again to FIG. 3, after defining the first and second regions of touch data, a center of the first region is calculated at 316, and a center of the second region is calculated at 318. The term "center" as used herein may refer to a mean of the pixel indices along each direction (such that the "center" is given by an average x value and an average y value), may refer to a weighted center of intensity, or other like value.

In one embodiment in which the mean of the x,y values is used to determine the centers of the first and second region, the centers of the first and second regions may be calculated as follows.

$$sumx(region1) = \sum_{v>threshold1} x$$

$$sumy(region1) = \sum_{v>threshold1} y$$

$$n1 = \sum_{v>threshold1} 1$$

$$sumx(region2) = \sum_{v>threshold2} x$$

$$sumy(region2) = \sum_{v>threshold2} y$$

$$n2 = \sum_{v>threshold2} 1$$

$$center(region1) = \left(\frac{sumx(region1)}{n1}, \frac{sumy(region1)}{n2}\right)$$

$$center(region2) = \left(\frac{sumx(region2)}{n1}, \frac{sumy(region2)}{n2}\right)$$

In another embodiment, the "centers" of the first and second region correspond to weighted centers of intensity, and are calculated as follows, where the terms x and y are pixel indices and v is a weighting factor equal to, proportional to, or otherwise a function of the intensity at the indexed pixel.

$$sumvx(region1) = \sum_{v>threshold} vx$$

$$sumvy(region1) = \sum_{v>threshold} vy$$

$$sumv(region1) = \sum_{v>threshold} v$$

$$sumvx(region2) = \sum_{v \leq threshold} vx$$

$$sumvy(region2) = \sum_{v \leq threshold} vy$$

$$sumv(region2) = \sum_{v \leq threshold} v$$

$$center(region1) = \left(\frac{sumvx(region1)}{sumv(region1)}, \frac{sumvy(region1)}{sumv(region1)}\right)$$

$$center(region2) =$$
$$\left(\frac{sumvx(region1) + sumvx(region2)}{sumv(region1) + sumv(region2)}, \frac{sumvy(region1) + sumvy(region2)}{sumv(region1) + sumv(region2)}\right)$$

In the above equations, pixels in the first region are defined as having an intensity above the threshold, while pixels in the second region are defined as having intensity equal to or below. However, it will be appreciated that the first region may include pixels that are equal to or above the threshold intensity, and the second region may have pixels that are below. Therefore, the terms "above a threshold", "exceeds a threshold", and the like as used herein may signify either "greater than" or "greater than or equal to".

After determining the centers of the first and second regions, the direction between the centers may be determined at 320 via the calculation:

$$\text{Direction} = \text{unit}\,(center(region1) - center(region2)), \text{ where}:$$

$$unit(x, y) = \left(\frac{x}{\sqrt{x^2 + y^2}}, \frac{y}{\sqrt{x^2 + y^2}}\right)$$

Figure 6:
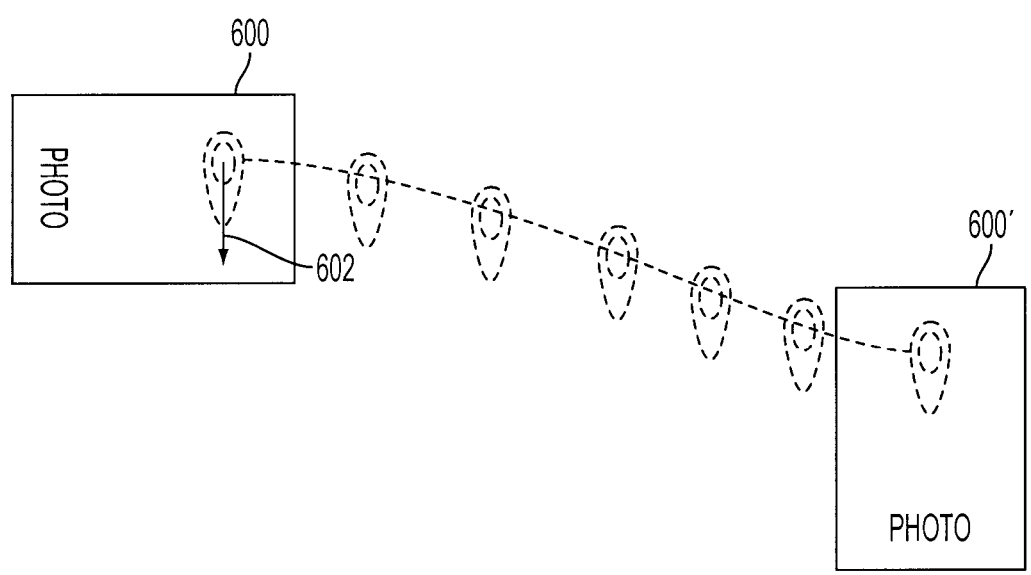
FIG. 6 shows a schematic depiction of an adjustment made to an image in response to a determined finger orientation.

After determining the direction of the finger on the touch-sensitive device, an image displayed on the device may be displayed or adjusted in a manner based upon the determined direction, as indicated at 322. An illustration of an example of such an adjustment is shown in FIG. 6, in which a photograph facing a first user is touched and dragged toward a second user sitting ninety degrees around the device of FIG. 1 from the first user. Initially, as indicated at 600, the photograph is facing the first user. Upon being touched and dragged toward the second user, the orientation of the second user's finger, shown at 602, is detected, and the photograph is rotated to face the second user based upon the detected direction, as indicated at 602'. This allows the second user to move and view the photograph through a single motion in an intuitive fashion, without having to learn any touch gestures to cause the rotation.

Figure 7:
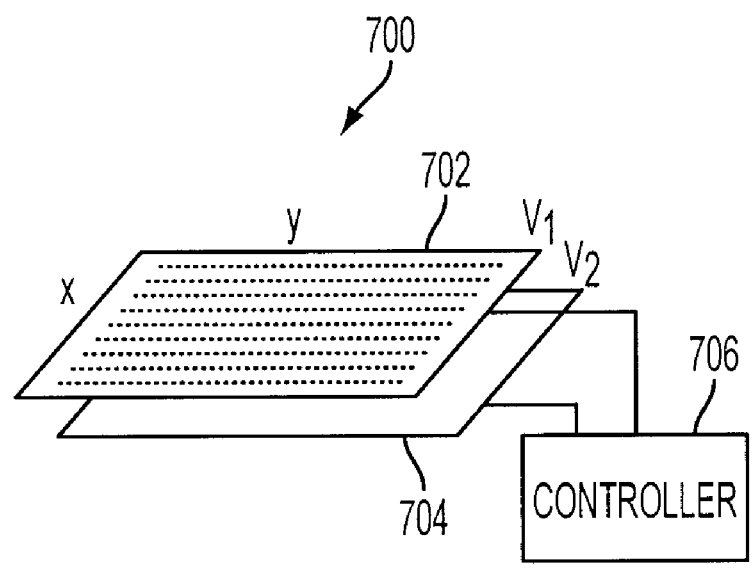
FIG. 7 shows a schematic depiction of an embodiment of a resistive touch-sensitive device.

As mentioned above, the embodiments disclosed herein may also be used with touch-sensitive mechanisms besides optical touch-sensitive mechanisms. First, FIG. 7 shows a simple schematic diagram of a resistive touch-sensitive display 700. The resistive touch-sensitive display 700 comprises two layers 702, 704 held in a separated arrangement by one or more spacers (not shown). Each layer comprises an electrically conductive coating facing the other layer, and at least one of the layers comprises a resistive coating. A voltage V1 is applied to layer 702, and a voltage V2 is applied to layer 704. When touched, layers 702 and 704 are pressed together, thereby completing a circuit between layers 702 and 704. The (x,y) touch location and a measure of touch intensity may be determined by a controller 706 by analyzing the properties of the signal produced by the contacted layers.

Figure 8:
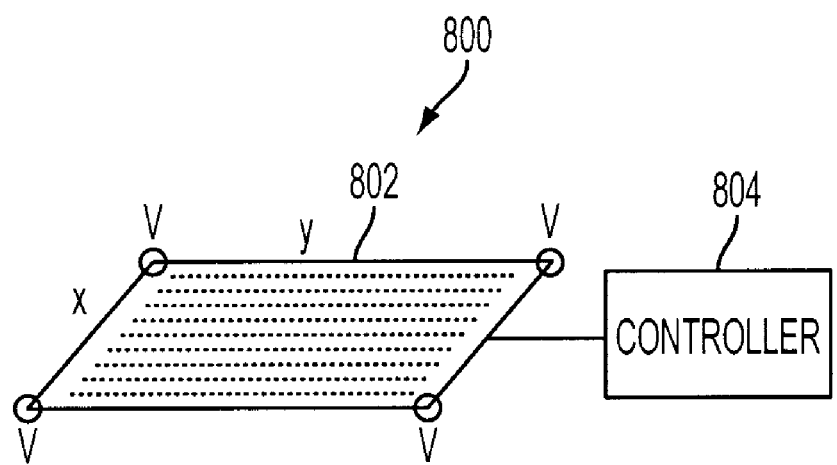
FIG. 8 shows a schematic depiction of an embodiment of a capacitive touch-sensitive display.

Next, FIG. 8 shows a simple schematic diagram of a capacitive touch-sensitive display 800. The capacitive touch-sensitive display 800 comprises a capacitive layer 802 comprising rows and columns of a transparent conductor such as indium tin oxide. When the screen is touched, some charge is transferred to the touching object as long as the object is electrically conductive. The decrease in stored charge is detected by the measurement of voltage at each corner of the screen, and the (x,y) touch location and intensity of touch pressure may be determined from these voltage measurements by a controller 804.

Each of these systems may be configured to output touch intensity data, and therefore may be used to determine the orientation of a finger as disclosed herein, although the density of data points may be lower than that achievable in an optical touch-sensing mechanism. It will further be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of any of the above-described processes is not necessarily required to achieve the features and/or results of the embodiments described herein, but is provided for ease of illustration and description.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing device, comprising:
   a display screen configured to display an image to a user;
   an intensity-sensitive touch-sensing input mechanism configured to acquire an array of touch intensity data and to detect one or more objects touching the display screen from the array of touch intensity data; and
   a controller comprising a processor and memory containing instructions executable by the processor to determine an orientation of a finger touching the display screen from a direction between a center a first region of touch data of a higher intensity and a center of a second region of touch data of a lower intensity, and to orient an image on the display screen to correspond to a determined orientation of the finger touching the display screen.

2. The device of claim 1, wherein the instructions are executable to define the first region of touch data as touch data that exceeds a threshold intensity value.

3. The device of claim 2, wherein the threshold intensity value comprises a weighted average intensity of the array of touch intensity data.

4. The device of claim 3, wherein each intensity value in the weighted average intensity is weighted by a weighting factor comprising a gradient of the intensity value.

5. The device of claim 1, wherein the instructions are executable to determine the second region of touch data as having a preselected shape around the first region of touch data.

6. The device of claim 1, wherein the instructions are executable to determine the first region of touch data as data that exceeds a first threshold intensity value and the second region of touch data as data that exceeds a second threshold intensity value lower than the first threshold intensity value.

7. A computing device, comprising:
   a display screen;
   a touch-sensitive input configured to acquire a frame of touch intensity data comprising an array of touch intensity values and to detect one or more fingers touching the display screen from the frame of touch intensity data; and
   a controller comprising a processor and memory containing instructions executable by the processor to determine an orientation of a finger detected on the display screen by detecting a first region of touch data in the frame of touch intensity data in which substantially all pixels have intensities that exceed a threshold intensity value, detecting a second region of touch data in the frame of touch intensity data that surrounds the first region of touch data, calculating a center of the first region of touch data, calculating a center of the second region of touch data, determining a direction between the center of the first region of touch data and the center of the second region of touch data, and orienting an image on the display screen to correspond to a determined orientation of the finger touching the display screen.

8. The device of claim 7, wherein the touch-sensitive input comprises an optical touch-sensing mechanism.

9. The device of claim 7, wherein the touch-sensitive input comprises one or more of a capacitive touch-sensing mechanism and a resistive touch-sensing mechanism.

10. The device of claim 7, wherein the instructions are executable to calculate the centers of the first and second regions of touch data as weighted centers of intensity by using an intensity at each pixel as a weighting factor.

11. The device of claim 7, wherein the instructions are executable to define an outer border of the second region as having an intensity a preselected amount lower than an outer border of the first region.

12. The device of claim 7, wherein the instructions are executable to define an outer border of the second region as having a preselected shape.

13. The device of claim 7, wherein the instructions are executable to determine the threshold intensity from a weighted average intensity of the touch data, and wherein a gradient at each pixel is used as a weighting factor for the intensity at that pixel.

14. In a computing device comprising a touch-sensitive input, a method of determining an orientation of a finger touching the touch-sensitive input, the method comprising:
- acquiring an image comprising a two-dimensional array of touch data from the touch-sensitive input;
- determining a first region of touch data in the image in which an intensity of each pixel exceeds a first threshold intensity;
- determining a second region of touch data in the image that surrounds the first region of touch data and in which an intensity of each pixel exceeds a second threshold intensity;
- calculating a weighted center of intensity of the first region of touch data;
- calculating a weighted center of intensity of the second region of touch data;
- determining a direction between the weighted center of intensity of the second region of touch data and the weighted center of intensity of the first region of touch data to determine an orientation of a finger; and
- rotating an image displayed on the touch-sensitive input based upon the direction.

15. The method of claim 14, wherein the intensity at each pixel is used as a weighting factor in determining the weighted centers of intensity of the first and second regions of touch data.

16. The method of claim 14, wherein an outer border of the second region extends a preselected distance from an outer border of the first region.

17. The method of claim 14, wherein the second region has a preselected shape around an outer border of the first region.

18. The method of claim 14, wherein the first and second threshold intensities are determined from a weighted average intensity of the touch data weighted by a gradient at each pixel.

19. The method of claim 18, wherein the gradient at each pixel is determined via a Sobel filter.

* * * * *